(12) United States Patent
Usui

(10) Patent No.: US 8,493,626 B2
(45) Date of Patent: Jul. 23, 2013

(54) BINARIZATION-USE-PATTERN GENERATING METHOD AND PRINTING APPARATUS

(75) Inventor: Nobuaki Usui, Ishikawa (JP)

(73) Assignee: PFU Limited (JP)

( * ) Notice: Subject to any disclaimer, the term of this patent is extended or adjusted under 35 U.S.C. 154(b) by 1063 days.

(21) Appl. No.: 12/491,601

(22) Filed: Jun. 25, 2009

(65) Prior Publication Data

US 2009/0262399 A1 Oct. 22, 2009

Related U.S. Application Data

(63) Continuation of application No. PCT/JP2008/060180, filed on Jun. 3, 2008.

(30) Foreign Application Priority Data

Jan. 18, 2008 (JP) ................. 2008-009605

(51) Int. Cl.
*H04N 1/405* (2006.01)
(52) U.S. Cl.
USPC .......................................... 358/3.2; 358/3.16
(58) Field of Classification Search
USPC .................. 358/1.8–1.9, 2.1, 3.2, 3.06–3.09, 358/3.13–3.14, 3.16–3.18, 3.24–3.27, 1.16
See application file for complete search history.

(56) References Cited

U.S. PATENT DOCUMENTS

| 2002/0101617 A1 | 8/2002 | Nagae et al. |
| 2005/0219627 A1 | 10/2005 | Usui et al. |
| 2006/0159353 A1 | 7/2006 | Nagae et al. |

FOREIGN PATENT DOCUMENTS

| JP | 09-107473 A | 4/1997 |
| JP | 2003-163806 A | 6/2003 |
| JP | 2005-167492 A | 6/2005 |
| JP | 4000255 B2 | 8/2007 |

*Primary Examiner* — Thomas D Lee
*Assistant Examiner* — Stephen M Brinich
(74) *Attorney, Agent, or Firm* — Lowe Hauptman Ham & Berner, LLP

(57) ABSTRACT

In the present invention, tetragons are generated, each of the tetragons being formed of four points of a point $A(c, 1)$, a point $B(a+c, b+1)$, a point $C(0, d+1)$, and a point $D(a, b+d+1)$ specified with arbitrary parameters satisfying the specified number of pixels $n=2(ad+bc)$. From among the generated tetragons, a tetragon having an angle closest to a specified angle is selected, and two of the selected tetragons are placed adjacently to each other to generate the basic pattern. A lighting order is determined so that, continuously from a lighting order of pixels forming a first tetragon of the tetragons of the basic pattern in order of increasing distance from a specific point of the first tetragon, pixels are lit in order of decreasing distance from the specific point, and a rectangular pattern functioning as a binarization-use pattern is generated.

4 Claims, 10 Drawing Sheets

|    |    |    |    | 57 | 61 | 63 | 59 |    |    |    |    |
|----|----|----|----|----|----|----|----|----|----|----|----|
|    |    |    |    | 41 | 49 | 51 | 43 |    |    |    |    |
|    |    | 37 | 33 | 25 | 17 | 19 | 27 | 35 | 39 |    |    |
|    |    | 45 | 29 | 13 |  5 |  7 | 15 | 31 | 47 |    |    |
| 69 | 65 | 53 | 21 |  9 |  1 |  3 | 11 | 23 | 55 | 67 | 71 |
| 72 | 68 | 56 | 24 | 12 |  4 |  2 | 10 | 22 | 54 | 66 | 70 |
|    |    | 48 | 32 | 16 |  8 |  6 | 14 | 30 | 46 |    |    |
|    |    | 40 | 36 | 28 | 20 | 18 | 26 | 34 | 38 |    |    |
|    |    |    |    | 44 | 52 | 50 | 42 |    |    |    |    |
|    |    |    |    | 60 | 64 | 62 | 58 |    |    |    |    |

100
BINARIZATION-USE-PATTERN GENERATING APPARATUS

|   |   |   |   |   |   |   |   |   |   | 88 | 84 | 82 | 86 |   |   |   |   |   |   |   |   |
|---|---|---|---|---|---|---|---|---|---|---|---|---|---|---|---|---|---|---|---|---|---|
|   |   |   |   |   |   |   |   |   |   | 104 | 96 | 94 | 102 |   |   |   |   |   |   |   |   |
|   |   |   |   |   |   |   |   | 108 | 112 | 120 | 128 | 126 | 118 | 110 | 106 |   |   |   |   |   |   |
|   |   |   |   |   |   |   |   | 100 | 116 | 132 | 140 | 138 | 130 | 114 | 98 |   |   |   |   |   |   |
|   |   |   |   |   |   | 76 | 80 | 92 | 124 | 136 | 144 | 142 | 134 | 122 | 90 | 78 | 74 |   |   |   |   |
|   |   |   |   |   |   | 73 | 77 | 89 | 121 | 133 | 141 | 143 | 135 | 123 | 91 | 79 | 75 |   |   |   |   |
|   |   |   |   | 57 | 61 | 63 | 59 | 97 | 113 | 129 | 137 | 139 | 131 | 115 | 99 | 57 | 61 | 63 | 59 |   |   |
|   |   |   |   | 41 | 49 | 51 | 43 | 105 | 109 | 117 | 125 | 127 | 119 | 111 | 107 | 41 | 49 | 51 | 43 |   |   |
|   |   | 37 | 33 | 25 | 17 | 19 | 27 | 35 | 39 | 101 | 93 | 95 | 103 | 37 | 33 | 25 | 17 | 19 | 27 | 35 | 39 |
|   |   | 45 | 29 | 13 | 5 | 7 | 15 | 31 | 47 | 85 | 81 | 83 | 87 | 45 | 29 | 13 | 5 | 7 | 15 | 31 | 47 |
| 69 | 65 | 53 | 21 | 9 | 1 | 3 | 11 | 23 | 55 | 67 | 71 | 69 | 65 | 53 | 21 | 9 | 1 | 3 | 11 | 23 | 55 | 67 | 71 |
| 72 | 68 | 56 | 24 | 12 | 4 | 2 | 10 | 22 | 54 | 66 | 70 | 72 | 68 | 56 | 24 | 12 | 4 | 2 | 10 | 22 | 54 | 66 | 70 |
|   |   | 48 | 32 | 16 | 8 | 6 | 14 | 30 | 46 | 88 | 84 | 82 | 86 | 48 | 32 | 16 | 8 | 6 | 14 | 30 | 46 |
|   |   | 40 | 36 | 28 | 20 | 18 | 26 | 34 | 38 | 104 | 96 | 94 | 102 | 40 | 36 | 28 | 20 | 18 | 26 | 34 | 38 |
|   |   |   |   | 44 | 52 | 50 | 42 | 108 | 112 | 120 | 128 | 126 | 118 | 110 | 106 | 44 | 52 | 50 | 42 |   |   |
|   |   |   |   | 60 | 64 | 62 | 58 | 100 | 116 | 132 | 140 | 138 | 130 | 114 | 98 | 60 | 64 | 62 | 58 |   |   |
|   |   |   |   |   |   | 76 | 80 | 92 | 124 | 136 | 144 | 142 | 134 | 122 | 90 | 78 | 74 |   |   |   |   |
|   |   |   |   |   |   | 73 | 77 | 89 | 121 | 133 | 141 | 143 | 135 | 123 | 91 | 79 | 75 |   |   |   |   |
|   |   |   |   |   |   |   |   | 97 | 113 | 129 | 137 | 139 | 131 | 115 | 99 |   |   |   |   |   |   |
|   |   |   |   |   |   |   |   | 105 | 109 | 117 | 125 | 127 | 119 | 111 | 107 |   |   |   |   |   |   |
|   |   |   |   |   |   |   |   |   |   | 101 | 93 | 95 | 103 |   |   |   |   |   |   |   |   |
|   |   |   |   |   |   |   |   |   |   | 85 | 81 | 83 | 87 |   |   |   |   |   |   |   |   |

BINARIZATION-USE-PATTERN GENERATING METHOD AND PRINTING APPARATUS

CROSS-REFERENCE TO RELATED APPLICATIONS

This application is a continuation of PCT international application Ser. No. PCT/JP2008/60180 filed on Jun. 3, 2008 which designates the United States, incorporated herein by reference, and which claims the benefit of priority from Japanese Patent Application No. 2008-009605, filed on Jan. 18, 2008, the entire contents of which are incorporated herein by reference.

BACKGROUND OF THE INVENTION

1. Field of the Invention

The present invention relates to a binarization-use-pattern generating method and printing apparatus and, in particular, to a binarization-use-pattern (dither pattern table) generating method and printing apparatus for use in a binarizing process of converting a multi-value image (continuous tone image), such as a natural image, a graphic image, and a color character, to a binary image.

2. Description of the Related Art

To output from an output device, such as a printer, a multi-value image, such as a natural image, a graphic image, and a color character, obtained as being captured or generated from an input device, such as a scanner, a binarizing process is required so as to represent this multi-value image with ON/OFF of a color material (such as ink or toner; hereinafter, also referred to as dots).

As one binarizing technique, dithering is known. Dithering is a technique of comparing the magnitudes between a value of a specific pixel (target pixel) in a multi-value image and a preset threshold to determine a gradation density of picture elements and determining ON/OFF of dots for the pixels according to the gradation density of the picture elements by using a binarization-use pattern provided in advance. Here, dither (halftone dots) refers to a look-up table for use in converting picture elements with multi-levels of gradation to a "binary image (indicating whether to apply ink or not)".

In dithering, clustered dithering has been known in which, as the gradation density of picture elements increases, a color material is applied to (lit at) pixels in order of increasing distance from a specific point as a center, thereby representing the gradation of the picture elements. In clustered dithering, a dot gain (ink spreading) is small, and the color material is stably fixed on a printing medium. Therefore, when the amount of color material to be applied to each pixel is subtle, this clustered dithering is preferable for use than diffused dithering, and techniques of generating a binarization-use pattern for clustered dithering have been developed.

For example, Japanese Patent No. 4000255 (hereinafter, referred to as "Patent Document 1") by the inventors of the present application discloses a binarization-use-pattern generation technique in which, to generate a clustered binarization pattern with a desired angle and number of pixels, basic pattern shapes are generated as tetragons formed of four points of a point A(c, 1), a point B(a+c, b+1), a point C(0, d+1), and a point D(a, b+d+1) specified with arbitrary parameters a, b, c, and d (where a, b, c, and d are integers) satisfying a condition of the number of pixels n=ad+bc specified; from among the generated tetragons, a tetragon having an angle closest to a specified angle is selected as a basic pattern; a lighting order of pixels forming the basic pattern is determined; and a rectangular pattern that functions as a binarization-use pattern is generated based on the basic pattern.

However, when the look-up table to be used for converting a binary image is generated in an unreliable manner, problems occur such that binarization cannot be made or a pattern not present in the original image (moire) appears on a print image.

Here, in the technology disclosed in Patent Document 1, clustered dither (halftone dots) in general printing is generated based on calculation for output with high-definition print-image quality. Also for moire occurring as a result of printing, halftone dots can be advantageously generated through calculation for quick handling. However, there are yet problems as follows.

For example, even when a color chip for fixing 10% ink and a color chip for fixing 90% ink are superposed upon each other, it is disadvantageously impossible to achieve a color chip as closest to solid printing (100% ink) as possible. Since designing required for printing is performed by humans, the property is necessarily required for printing process. Unless this problem is solved, it causes reprinting because "the color as intended is not reproduced".

This problem is serious particularly in the case of 50% ink, where it is important that an area where ink is applied is equal to a paper-only area where no ink is applied. However, since "ink spreading (dot gain)" is present on print in actual use, if the ink fixing area is tried to be achieved as accurately as numerals indicate, it is required to provide a one-dimensional look-up table for converting numerical values for each level of gradation and to make a correction so that the printing result has the ink fixing area specified by electronic data.

However, to make this possible, it is presumed that the ink fixing region is varied according to the value of input electronic data. If ink is not fixed or the ink fixing region is not varied, a gradation crush disadvantageously cannot be prevented with whatever measures taken. FIG. 1 is a drawing of a basic pattern of halftone dots generated based on Patent Document 1 as a conventional technology (with conditions that the number of picture elements (the number of pixels) is 72 and the screen angle is 45 degrees).

As depicted in FIG. 1, according to the conventional technology (Patent Document 1), a high-definition clustered dither pattern for use in printing a monochrome or color image can be automatically generated by a computer. However, there are various problems. For example, even with the technology of Patent Document 1, the ink fixing area cannot be completely controlled with the binarization-use pattern based on this basic pattern. As adjacent ink fixing regions are closer to each other, the ink fixing regions are adhered to each other due to surface tension, and therefore an abrupt increase in the ink fixing region and shape due to physical properties cannot be controlled any longer even if the value of the electronic data is changed. In particular, since a numeral of 50% represents a numerical value often used in designing by designers, if color reproduction cannot be controlled at 50%, an impression is made that whole printing is not good, leading to "a request for reprinting from a designer" in printing process and disadvantageously decreasing printing profitability.

SUMMARY OF THE INVENTION

It is an object of the present invention to at least partially solve the problems in the conventional technology.

According to an aspect of an embodiment, a method of generating a binarization-use pattern for use in binarization of a multi-value image, includes generating a basic pattern of the binarization-use pattern through calculation; determining a lighting order of pixels forming the basic pattern; and generating based on the basic pattern a rectangular pattern that functions as the binarization-use pattern, wherein generating the basic pattern includes specifying an angle of the binarization-use pattern; specifying the number of pixels forming the basic pattern; and generating the basic-pattern-shape through calculation based on the angle specified at specifying the angle and the number of pixels specified at specifying the number of pixels, at generating the basic-pattern-shape, tetragons are generated, each of the tetragons being formed of four points of a point A(c, 1), a point B(a+c, b+1), a point C(0, d+1), and a point D(a, b+d+1) specified with arbitrary parameters a, b, c, and d, where a, b, c, and d are integers, satisfying the number of pixels n=2(ad+bc) specified at specifying the number of pixels; from among the generated tetragons, a tetragon having an angle closest to the angle of the binarization-use pattern specified at specifying the angle is selected; and two of the selected tetragons are placed adjacently to each other to generate the basic pattern, at determining the lighting-order, the lighting order is determined so that pixels forming a first tetragon of the tetragons of the basic pattern are lit in order of increasing distance from a specific point of the first tetragon, and the lighting order is determined so that, continuously from the lighting order of the first tetragon, pixels forming a tetragon next to the first tetragon of the tetragons of the basic pattern are lit in order of decreasing distance from the specific point of the next tetragon.

According to another aspect of an embodiment, a printing apparatus includes a binarizing unit that binarizes a multi-value image based on a binarization-use pattern; and an image forming unit that forms an image on a medium based on results of binarization performed by the binarizing unit, wherein a basic pattern is formed by placing two tetragons adjacently to each other, each of the tetragons being formed of four points of a point A(c, 1), a point B(a+c, b+1), a point C(0, d+1), and a point D(a, b+d+1) specified with arbitrary parameters a, b, c, and d, where a, b, c, and d are integers, satisfying the number of pixels n=2(ad+bc) of the basic pattern, the binarization-use pattern is generated based on the basic pattern, and according to a gradation of the multi-value image, the pixels are lit so that pixels forming a first tetragon of the tetragons of the basic pattern are lit in order of increasing distance from a specific point of the first tetragon, and the pixels are lit so that, continuously from the lighting order of the first tetragon, pixels forming a tetragon next to the first tetragon of the tetragon of the basic pattern are lit in order of decreasing distance from the specific point of the next tetragon, thereby generating continuous halftone dots.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 3 is a drawing of a figure formed by placing two tetragons depicted in FIG. 1 adjacently to each other;
FIG. 4 is a drawing of an example of a next tetragon forming the basic pattern of the present invention;
FIG. 5 is a drawing of an example of the basic pattern in which a lighting order is determined through the process of a lighting-order determining unit of the present invention;
FIG. 6 is a drawing of an example of halftone dots when two basic patterns are developed.

DETAILED DESCRIPTION OF THE PREFERRED EMBODIMENTS

Embodiments of the binarization-use-pattern generating method and printing apparatus according to the present invention are explained in detail below with reference to the drawings. Note that the present invention is not meant to be restricted by the embodiments.

In the following, a general outline of the present invention is explained, and then the configuration, processing, and others of the present invention are explained in detail.

Figures 1, 2:
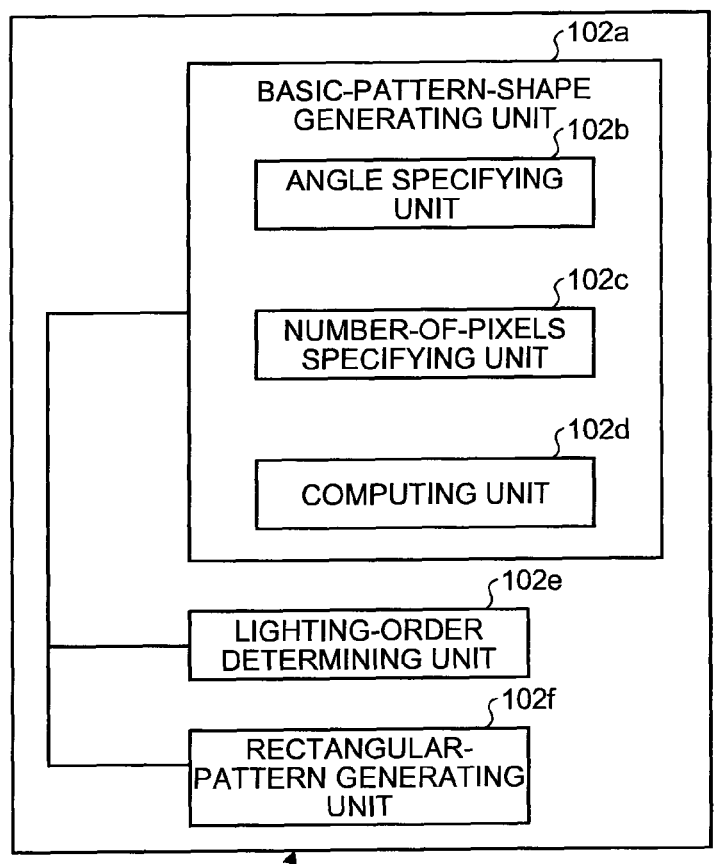
FIG. 1 is a drawing of a basic pattern of halftone dots generated based on a conventional technology.
FIG. 2 is a configuration diagram of the principle of the basic configuration of the present invention.

The present invention substantially has the following basic features. FIG. 2 is a configuration diagram of the principle of the basic configuration of the present invention. That is, a binarization-use-pattern generating apparatus 100 of the present invention is configured to include a basic-pattern-shape generating unit 102a that generates a basic pattern shape of a binarization-use pattern through computation, a lighting-order determining unit 102e that determines a lighting order of pixels forming the basic pattern, and a rectangular-pattern generating unit 102f that generates a rectangular pattern that functions as a binarization-use pattern based on the basic pattern. Here, the basic-pattern-shape generating unit 102a includes, as depicted in FIG. 2, an angle specifying unit 102b that specifies an angle of the binarization-use pattern, a number-of-pixels specifying unit 102c that specifies the number of pixels forming the basic pattern, and a computing unit 102d that generates a basic pattern shape through computation based on the angle specified by the angle specifying unit 102b and the number of pixels specified by the number-of-pixels specifying unit 102c.

In the configuration, the angle specifying unit 102b of the present invention first performs control so as to specify the angle of the binarization-use pattern (for example, 45 degrees).

The number-of-pixels specifying unit 102c of the present invention then performs control so as to specify the number of pixels (for example, 144 pixels) forming the basic pattern.

The computing unit 102d of the present invention then generates a basic pattern shape through computation based on the angle specified by the angle specifying unit 102b and the number of pixels specified by the number-of-pixels specifying unit 102c.

Specifically, the computing unit 102d generates tetragons ABDC, each being formed of four points of a point A(c, 1), a point B(a+c, b+1), a point C(0, d+1), and a point D(a, b+d+1) specified with arbitrary parameters a, b, c, and d (where a, b, c, and d are integers) satisfying the specified number of pixels n=2(ad+bc) specified by the number-of-pixels specifying unit 102c, and then selects from among the generated tetragons, a tetragon having an angle closest to the angle of the binarization-use pattern specified by the angle specifying unit 102b. For example, when the number of pixels of 144 and an angle of 45 degrees are specified, a tetragon as depicted in FIG. 1 is exemplarily generated (however, the lighting order number is not yet determined at this point in time).

Figures 3, 4:
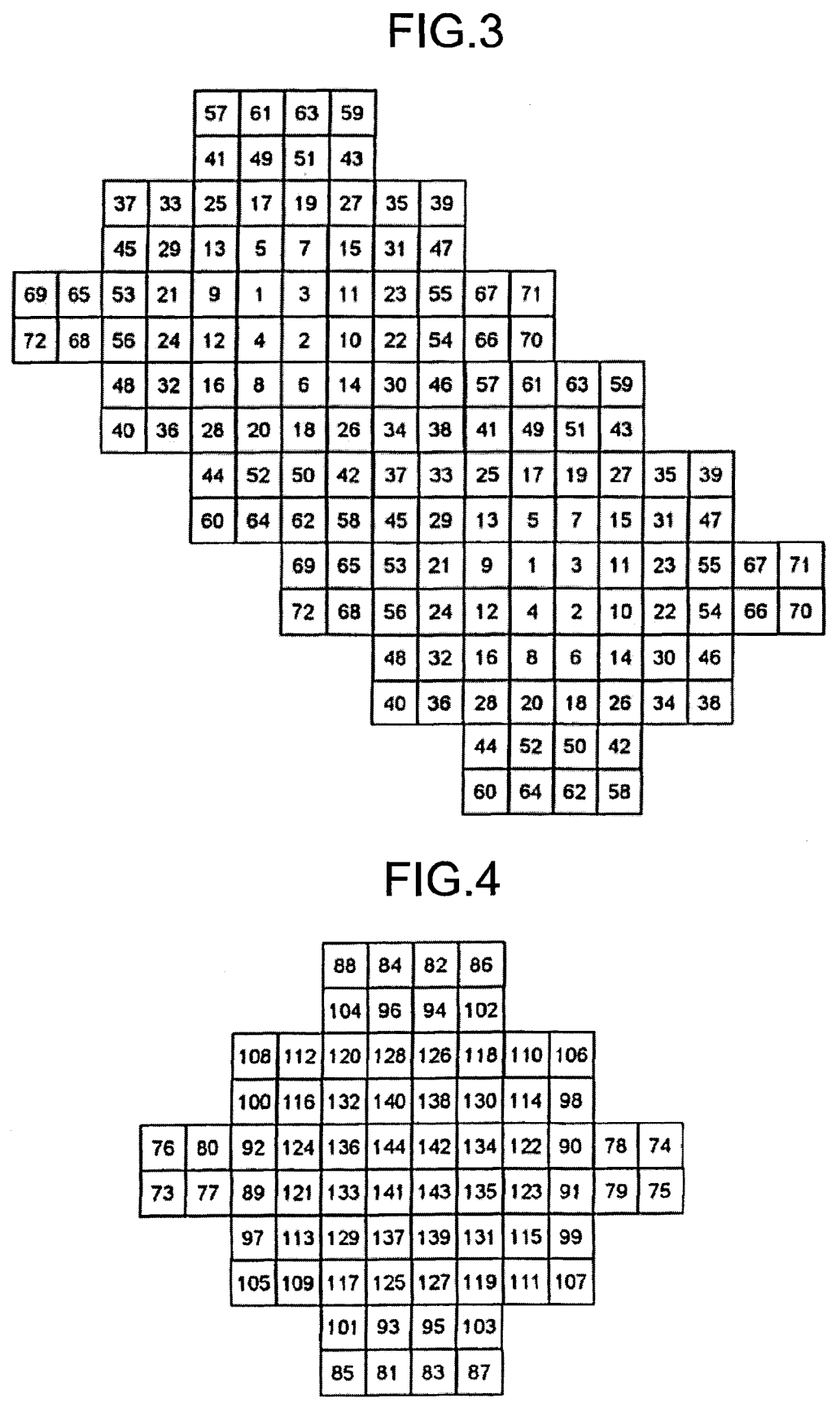

The computing unit 102d then places two of the selected tetragons adjacently to each other, thereby generating a basic pattern. FIG. 3 is a drawing of a figure formed by placing two tetragons depicted in FIG. 1 adjacently to each other. As depicted in FIG. 3, with two tetragons ABDC generated based on Patent Document 1 only being simply placed adjacently to each other, the adjacent ink fixing regions are close to each other, and therefore it is impossible to prevent the ink fixing regions from being combined together due to surface tension. In the present invention, a lighting order is further determined in a manner as explained below. Here, the lighting order is the order for generating a binarization-use pattern, the order in which a color agent (such as ink or toner) is fixed for each pixel forming the basic pattern according to the gradation of the picture elements.

That is, the lighting-order determining unit 102e of the present invention determines a lighting order so that the pixels forming the first tetragon of the basic pattern are lit in order of increasing distance from a specific point of the first tetragon (for example, the barycenter or center of the tetragon). The tetragon of FIG. 1 corresponds to the first tetragon of the basic pattern according to the present invention. With this process, the lighting order of the first tetragon is exemplarily determined as indicated in numerals in FIG. 1.

The lighting-order determining unit 102e of the present invention then determines a lighting order so that, continuously from the lighting order of the first tetragon, pixels forming the next tetragon of the basic pattern are lit in order of decreasing distance from the specific point of the next tetragon. FIG. 4 is a drawing of an example of the next tetragon forming the basic pattern of the present invention. As depicted in FIG. 4, the lighting order of the pixels of the next tetragon of the basic pattern is determined so that, continuously from the lighting order of the first tetragon depicted in FIG. 1 (in this example, continuously from 72, which is the last place in the lighting order of the first tetragon), the pixels are lit in order of decreasing distance from the specific point.

Here, the lighting-order determining unit 102e may determine the lighting order of the pixels of each tetragon of the basic pattern so that a length of a boundary contour line (perimeter length) between a lit pixel and a non-lit pixel is minimum or symmetric with the specific point or both.

Figure 5:
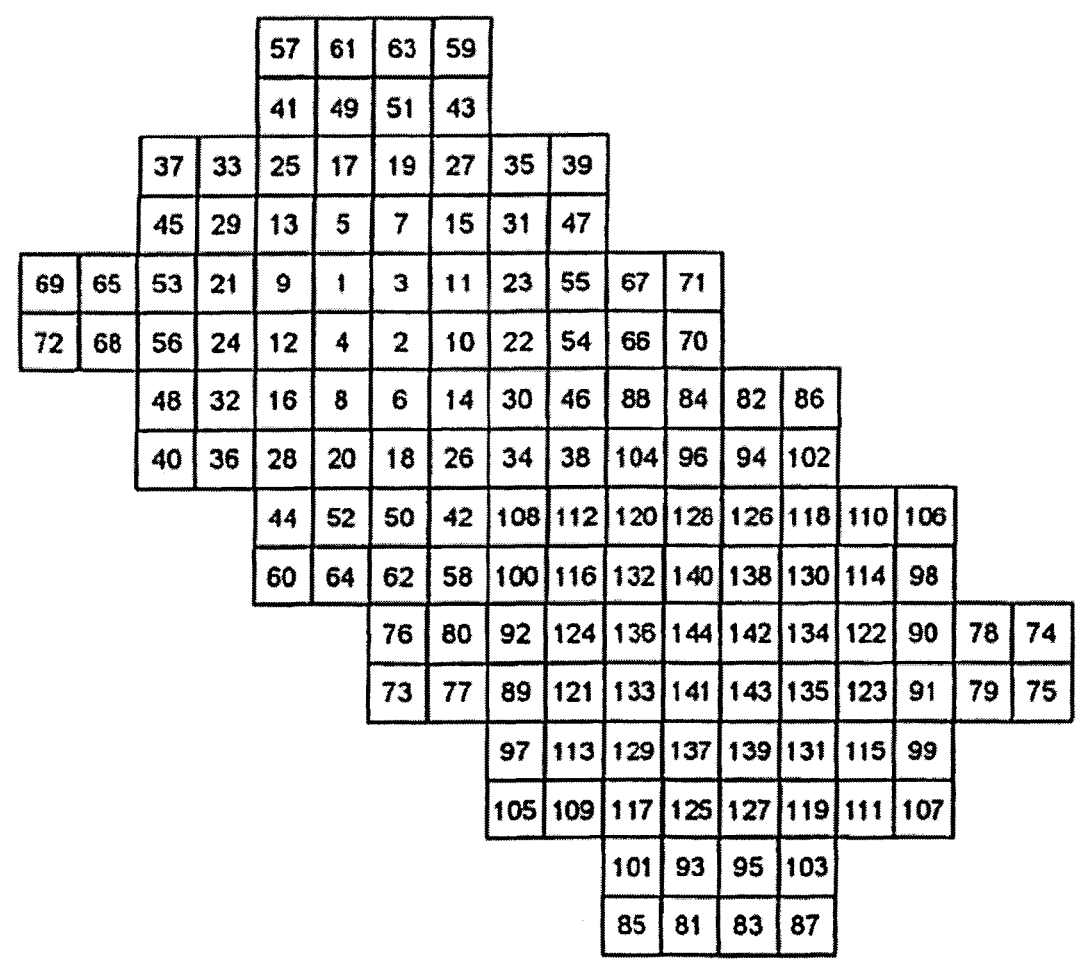

Also, here, the lighting-order determining unit 102e may determine the lighting order of the next tetragon of the basic pattern based on an equation of $I2=n-I1+1$, where $I2$ is a number indicating a place in the lighting order of the next tetragon, $n$ is the number of pixels specified at the number-of-pixels specifying step, and $I1$ is a number indicating a place in the lighting order of the first tetragon. That is, as exemplarily depicted in FIG. 4, a number obtained by subtracting a number $I1$ indicating the place in the lighting order of the first tetragon of FIG. 1 from the number of pixels $n$ specified by the number-of-pixels specifying unit 102c and then adding 1 to the subtraction result may be assigned to the relevant pixels of the next tetragon. FIG. 5 is a drawing of an example of the basic pattern in which a lighting order is determined through the process of the lighting-order determining unit 102e of the present invention.

With the lighting-order determining process, for the basic pattern of the present invention, as exemplarily depicted in FIG. 5, numbers each indicating a place in the lighting order are determined in order of increasing distance from the specific point for the first tetragon (refer to FIG. 1), whilst numbers are determined in order of decreasing distance from the specific point for the next tetragon (refer to FIG. 4).

Then, the rectangular-pattern generating unit 102f of the present invention generates based on the basic pattern a rectangular pattern that functions as a binarization-use pattern. Specifically, the basic pattern with its lighting order determined is two-dimensionally developed to generate halftone dots as depicted in FIG. 6 to generate a rectangular pattern. FIG. 6 is a drawing of an example of halftone dots when two basic patterns are developed.

As depicted in FIG. 6, two ink fixing regions are present, and when ink is to be fixed to 50% of the total number of picture elements, a complete checked pattern is achieved. That is, it is assured the region where ink is fixed and the region of paper only will have the same shape. With this, the shape of the ink fixing region actually on the paper in printing can be controlled by using the generated look-up table (halftone dots) and others without receiving an influence of surface tension of ink.

That is, from the above, (1) the ink fixing regions can be separated from each other as much as possible, preventing "color hopping" due to an abrupt expansion of the ink fixing regions due to surface tension of ink. Also, (2) in particular, when each ink fixing region accounts for 50%, the above phenomenon of adherence to an adjacent ink fixing region becomes maximum. "Color hopping" in this can be reduced, thereby reducing fluctuations in print quality due to print conditions. Furthermore, (3) when the ink fixing area exceeds 90%, ink spreads to increase the possibility of crushing white portions of paper. According to the present invention, it is possible to design so that such a phenomenon most unlikely occurs. That is, according to the above, (4) gradation crushing due to ink spreading can be prevented and, as a result, printing with multiple levels of gradation can be achieved. Explanation of the general outline of the present invention is now completed.

Figure 7:
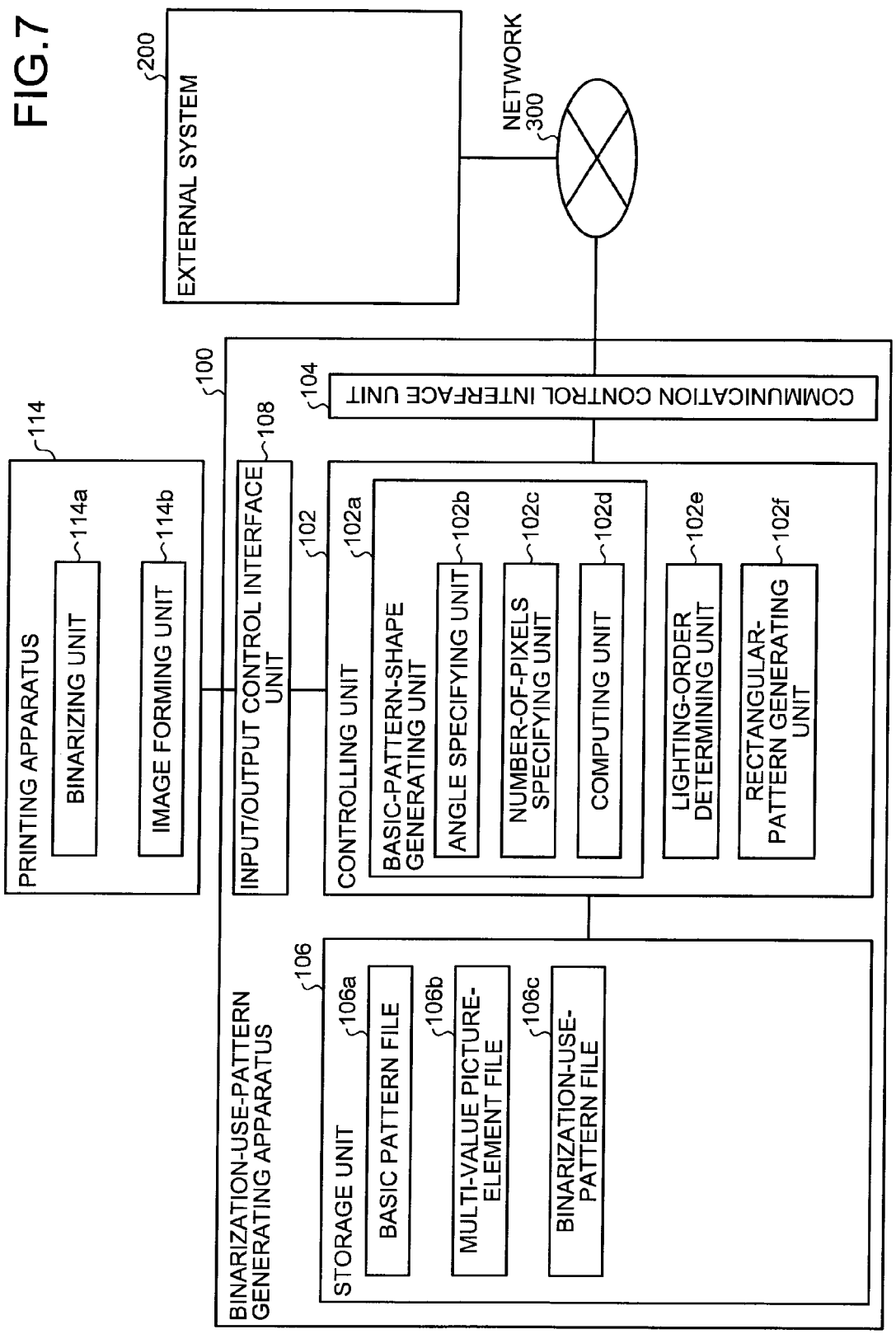
FIG. 7 is a block diagram of an example of the configuration of a binarization-use-pattern generating apparatus to which the present invention is applied.

Next, the configuration of the present binarization-use-pattern generating apparatus 100 is explained. FIG. 7 is a block diagram of an example of the configuration of the binarization-use-pattern generating apparatus 100 to which the present invention is applied, conceptually depicting only parts of the configuration that are related to the present invention.

In FIG. 7, the binarization-use-pattern generating apparatus 100 is schematically configured to include a controlling unit 102, such as a CPU, that controls the whole of the binarization-use-pattern generating apparatus 100 in a centralized manner, an input/output control interface unit 108 connected to a printing apparatus 114 and others, and a storage unit 106 that stores various databases and tables, and others, each of these units being communicably connected via an arbitrary communication path.

Various databases and tables (a basic pattern file 106a to a binarization-use-pattern file 106c) stored in the storage unit 106 are storage units, such as fixed disk devices, storing various programs, tables, files, databases, etc., for use in various processes.

Among these components of the storage unit 106, the basic pattern file 106a is a basic-pattern storage unit that stores a basic pattern. Here, the basic pattern is a collection (of pixels) for forming one halftone dot.

Also, a multi-value picture-element file 106b is a multi-value picture-element storage unit that stores multi-value image information including multi-value picture elements, such as natural images, graphic images, color characters, and others.

Furthermore, the binarization-use-pattern file 106c is a binarization-use-pattern storage unit that stores a rectangular pattern that functions as a binarization-use pattern. Here, the binarization-use pattern is to control a threshold in binarization, and is configured by repeatedly placing a basic pattern having a specific shape in a main scanning direction and a sub-scanning direction. Preferably, the binarization-use pattern may be configured by placing a next tetragon of the basic pattern adjacently to each of four directions of the first tetragon of the basic pattern.

Still further, in FIG. 7, the input/output control interface unit 108 controls the printing apparatus 114 and others. Here, the input/output control interface unit 108 may have connected thereto an output device such as a monitor (including a home television) or a loudspeaker, an input device such as a keyboard or a mouse, or others. Here, the printing apparatus 114 is functionally and conceptually configured to include a binarizing unit 114a and an image forming unit 114b. The binarizing unit 114a is a binarizing unit that binarizes a multi-value image based on the binarization-use pattern. Also, the image forming unit 114b is an image forming unit that forms an image on a medium such as paper based on the result of binarization performed by the binarizing unit 114a. Here, in this binarization, the value of a picture element of a multi-value image is compared by a comparator with a threshold set in advance in the binarization-use pattern for binarization.

Also, in FIG. 7, the controlling unit 102 has an internal memory for storing a control program such as an OS (Operating System), a program defining various process procedures and others, and necessary data, performing information processing for executing various processes with these programs and others. The controlling unit 102 is functionally and conceptually configured to include the basic-pattern-shape generating unit 102a, the lighting-order determining unit 102e, and the rectangular-pattern generating unit 102f.

Among these, the basic-pattern-shape generating unit 102a is a basic-pattern-shape generating unit that generates the shape of a basic pattern of a binarization-use-pattern through computation and stores the generated basic pattern in the basic pattern file 106a. Here, as depicted in FIG. 7, the basic-pattern-shape generating unit 102a is configured to include the angle specifying unit 102b, the number-of-pixels specifying unit 102c, and the computing unit 102d. The angle specifying unit 102b is an angle specifying unit that performs control so as to cause a user to specify the angle of the binarization-use pattern (screen angle). That is, the user is supposed to specify in advance this angle (for example, 30 degrees, 45 degrees, or others) as required. The number-of-pixels specifying unit 102c is a number-of-pixels specifying unit that performs control so as to cause the user to specify the number of pixels (n: natural number) forming the basic pattern. That is, the user is supposed to specify in advance the number of pixels (n) as required. With this, the number of levels of gradation and resolution represented by one halftone dot are specified. The computing unit 102d is a computing unit that generates a basic pattern shape through computation based on the angle specified by the angle specifying unit 102b and the number of pixels specified by the number-of-pixels specifying unit 102c.

Specifically, the computing unit 102d generates tetragons, each being formed of four points of a point $A(c, 1)$, a point $B(a+c, b+1)$, a point $C(0, d+1)$, and a point $D(a, b+d+1)$ specified with arbitrary parameters a, b, c, and d (where a, b, c, and d are integers) satisfying the specified number of pixels $n=2(ad+bc)$ specified by the number-of-pixels specifying unit 102c, and then selects from among the generated tetragons, a tetragon having an angle closest to the angle of the binarization-use pattern specified by the angle specifying unit 102b, and then places two of the selected tetragons adjacently to each other, thereby generating a basic pattern.

Here at this time, line segments AB, AC, CD, and BD forming the tetragon ABDC are respectively represented as follows.

line segment AB: $ay=b(x-c)+a$
line segment AC: $cy=-d(x-c)+c$
line segment CD: $ay=bx+a(d+1)$
line segment BD: $cy=-d(x-a)+(b+d+1)c$ In this manner, when generating pixels included in the tetragon ABDC, for pixels positioned on the line segments AB, AC, CD, and BD, the computing unit 102d may handle them according to the following rules (1) to (5), by way of example.

When lattice points of integers in an x and y coordinate system,
 (1) include the point A;
 (2) include all points on the line segments AB and AC;
 (3) when the y-coordinate value of the point B is smaller than the y-coordinate value of the point C, include points on the line segment CD;
 (4) when the y-coordinate value of the point B is greater than the y-coordinate value of the point C, include points on the line segment BD; and
 (5) do not include the points B, C, and D.

The computing unit 102d then generates tetragons ABDC according to the rules (1) to (5). Normally, since the parameters a, b, c, and d can be obtained through combinations of various values, the computing unit 102d selects from the generated tetragons a tetragon having an angle closest to the angle (screen angle) of the binarization-use pattern specified by the angle specifying unit 102b, and places two of the selected tetragons adjacently to each other, thereby generating a basic pattern.

Also, the lighting-order determining unit 102e is a lighting-order determining unit that determines a lighting order of the pixels forming the basic pattern and stores number information of the lighting order in association with the basic pattern stored in the basic pattern file 106a. Specifically, the lighting-order determining unit 102e determines a lighting order so that the pixels forming the first tetragon of the basic pattern are lit in order of increasing distance from a specific point of the first tetragon (for example, the barycenter or center of the tetragon), and then determines a lighting order so that, continuously from the lighting order of the first tetragon, pixels forming the next tetragon of the basic pattern are lit in order of decreasing distance from the specific point of the next tetragon. Here, the lighting-order determining unit 102e may determine the lighting order so that a length of a boundary contour line (perimeter length) between a lit pixel and a non-lit pixel is minimum or symmetric with the specific point or both. Also, here, the lighting-order determining unit 102e may determine the lighting order of the next tetragon of the basic pattern based on the equation of I2=n−I1+1 (where I2 is a number indicating a place in the lighting order of the next tetragon, n is the number of pixels specified by the number-of-pixels specifying unit 102c, and I1 is a number indicating a place in the lighting order of the first tetragon). Furthermore, for the pixels forming the first tetragon of the basic pattern, the lighting-order determining unit 102e may determine a lighting order in order of decreasing predetermined weight coefficient and then, for the pixels forming the next tetragon of the basic pattern, determine a lighting order, continuously from the lighting order of the first tetragon, in order of increasing predetermined weight coefficient.

Still further, the rectangular-pattern generating unit 102f is a rectangular-pattern generating unit that generates, based on the basic pattern stored in the basic pattern file 106a, a rectangular pattern that functions as a binarization-use pattern and stores the generated rectangular pattern in the binarization-use pattern file 106c. By the rectangular-pattern generating unit 102f, the basic pattern is repeatedly placed in the main scanning direction and the sub-scanning direction, thereby keeping continuity of halftone dots. Preferably, the rectangular-pattern generating unit 102f may configure the rectangular pattern so that a next tetragon of the basic pattern is placed adjacently to each of four directions of the first tetragon of the basic pattern. A detailed rectangular-pattern generating method will be explained further below. Also, here, the rectangular-pattern generating unit 102f may refers to the rectangular pattern stored in the binarization-use-pattern file 106c to binarize a multi-value image stored in the multi-value picture-element file 106b and control the input/output control interface unit 108 to transmit the binarization result to the printing apparatus 114. Here, the foregoing is not meant to be restrictive, binarization may be performed by the binarizing unit 114a of the printing apparatus 114, and the rectangular pattern that functions as a binarization-use pattern stored in the binarization-use-pattern file 106c and the multi-value image stored in the multi-value picture-element file 106b may be transmitted to the printing apparatus 114.

The foregoing is the basic configuration of the present binarization-use-pattern generating apparatus 100. Here, the binarization-use-pattern generating apparatus 100 may include a communication control interface unit 104 connected to a communication device (not shown) such as a router connected to a communication line or the like. That is, in FIG. 7, the communication control interface unit 104 performs communication control between the binarization-use-pattern generating apparatus 100 and a network 300 (or the communication device such as a router). That is, the communication control interface unit 104 has a function of communicating data with another terminal via a communication line, and this binarization-use-pattern generating apparatus 100 is communicably connected to the network 300 via the communication device such as a router and a wired or wireless communication line such as a dedicated line. Here, in FIG. 7, the network 300 has a function of mutually connecting the binarization-use-pattern generating apparatus 100 and an external system 200, and is exemplarily the Internet. That is, the binarization-use-pattern generating apparatus 100 may be configured to be communicably connected via the network 300 to the external system 200 that provides external databases and external programs regarding the basic pattern, the multi-value images, the rectangular patterns, and others.

In FIG. 7, the external system 200 is mutually connected to the binarization-use-pattern generating apparatus 100 via the network 300, and has a function of providing the user with external databases and external programs regarding the basic patterns, the multi-value images, the rectangular patterns, and others. Here, the external system 200 may be configured as a WEB server, an ASP server, or the like, and its hardware structure may be configured with a generally-available information processing apparatus such as a work station, a personal computer, or the like and its attached apparatuses. Also, each function of the external system 200 is achieved by a CPU, a disk device, a memory device, an input device, an output device, a communication control device, and others in the hardware structure of the external system 200, and programs for controlling these devices. Explanation of the present binarization-use-pattern generating apparatus 100 is now completed.

Next, an example of the process of the present binarization-use-pattern generating apparatus 100 configured as above in the present embodiment is explained in detail below with reference to FIGS. 8 to 12.

Figure 8:
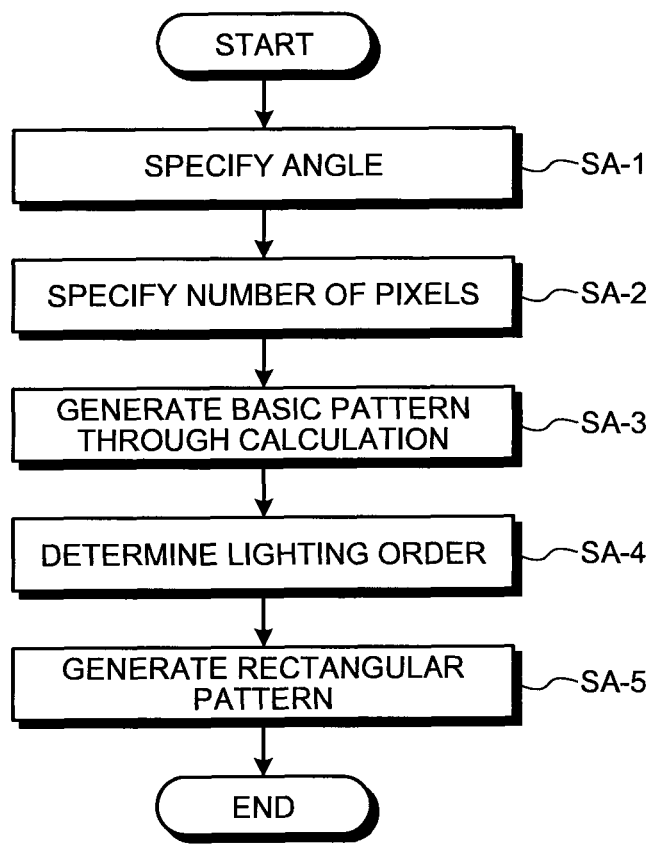
FIG. 8 is a flowchart of an example of a basic process of the present binarization-use-pattern generating apparatus according to an embodiment.

First, the basic process of the binarization-use-pattern generating apparatus 100 is explained with reference to FIG. 8. FIG. 8 is a flowchart of an example of the basic process of the present binarization-use-pattern generating apparatus 100 according to an embodiment.

As depicted in FIG. 8, the binarization-use-pattern generating apparatus 100 controls the input/output control interface unit 108 through the process of the angle specifying unit 102b so as to cause the user to specify an angle (screen angle) of the binarization-use pattern via the input device (step SA-1).

The binarization-use-pattern generating apparatus 100 then controls the input/output control interface unit 108 through the process of the number-of-pixels specifying unit 102c so as to cause the user to specify the number of pixels (n: natural number) forming the basic pattern via the input device (step SA-2).

The binarization-use-pattern generating apparatus 100 then generates, through the process of the computing unit 102d, a basic pattern through computation based on the angle (screen angle) specified by the angle specifying unit 102b and the number of pixels specified by the number-of-pixels specifying unit 102c (step SA-3). Specifically, the computing unit 102d generates tetragons, each of the tetragons being formed of four points of a point A(c, 1), a point B(a+c, b+1), a point C(0, d+1), and a point D(a, b+d+1) specified with arbitrary parameters a, b, c, and d (where a, b, c, and d are integers) satisfying the number of pixels n=2(ad+bc) specified at the number-of-pixels specifying unit 102c and, from among the generated tetragons, selects a tetragon having an angle closest to the angle of the binarization-use pattern specified by the angle specifying unit 102b, and places two of the selected tetragons adjacently to each other, thereby generating a basic pattern.

The binarization-use-pattern generating apparatus 100 then determines through the process of the lighting-order determining unit 102e a lighting order of the pixels forming the basic pattern, and stores number information of the lighting order in association with the basic pattern stored in the basic pattern file 106a (step SA-4). Specifically, the lighting-order determining unit 102e determines a lighting order so that the pixels forming the first tetragon of the basic pattern are lit in order of increasing distance from a specific point of the first tetragon (for example, the barycenter or center of the tetragon), and then determines a lighting order so that, continuously from the lighting order of the first tetragon, pixels forming the next tetragon of the basic pattern are lit in order of decreasing distance from the specific point of the next tetragon. Here, the lighting-order determining unit 102e may determine the lighting order of the pixels of the next tetragon forming the basic pattern based on the equation of I2=n−I1+1 (where I2 is a number indicating a place in the lighting order of the next tetragon, n is the number of pixels specified by the number-of-pixels specifying unit 102c, and I1 is a number indicating a place in the lighting order of the first tetragon).

The binarization-use-pattern generating apparatus 100 then generates, through the process of the rectangular-pattern generating unit 102f, a rectangular pattern that functions as a binarization-use pattern based on the basic pattern stored in the basic pattern file 106a and stores the generated rectangular pattern in the binarization-use-pattern file 106c (step SA-5). With this, the basic process of the binarization-use-pattern generating apparatus 100 ends.

Figure 9:
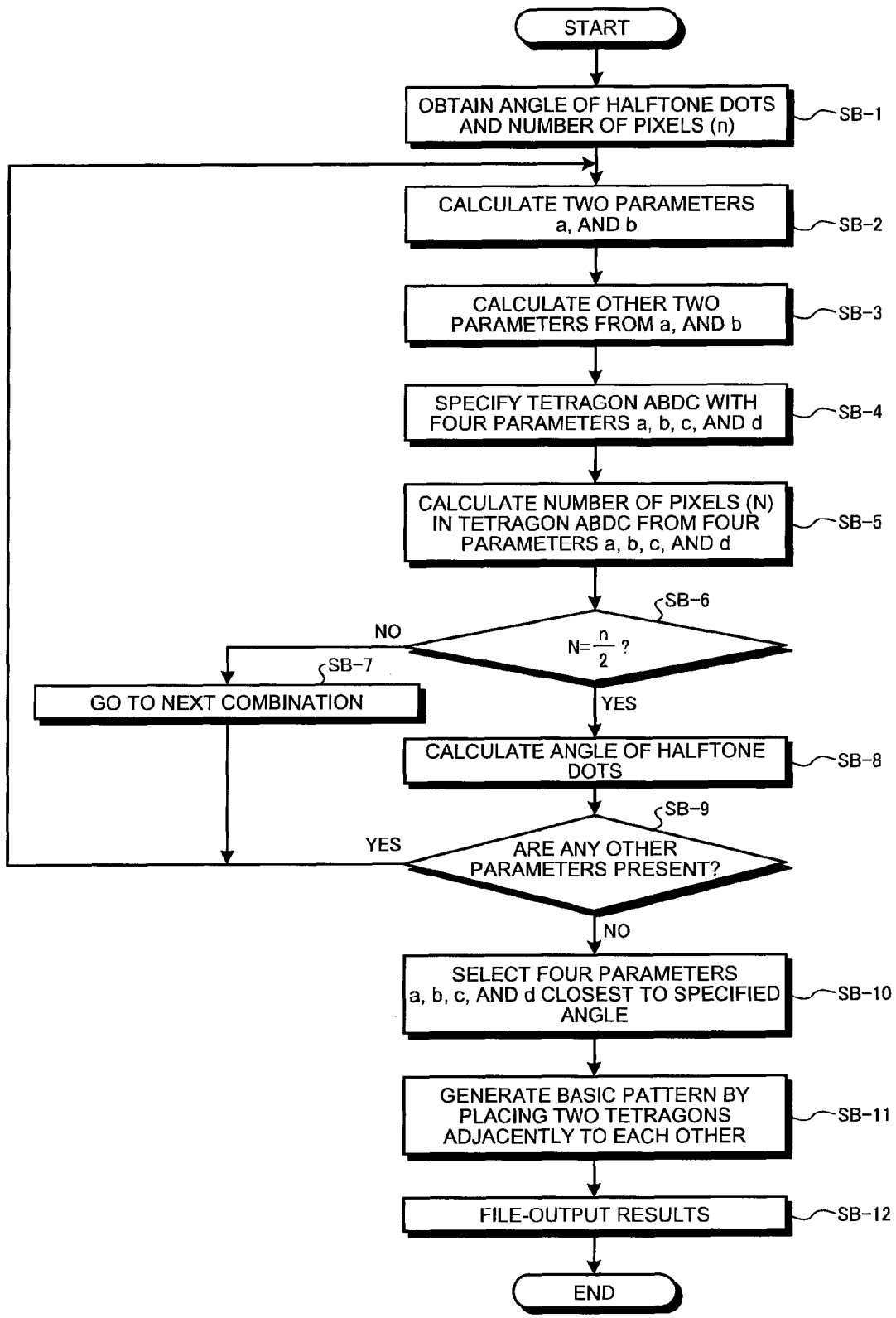
FIG. 9 is a flowchart of an example of a basic-pattern-shape generating process of the present binarization-use-pattern generating apparatus according to the embodiment.

Next, a basic-pattern-shape generating process (a process corresponding to step SA-3) through the process of the basic-pattern-shape generating unit 102a is explained in detail with reference to FIG. 9. FIG. 9 is a flowchart of an example of the basic-pattern-shape generating process of the present binarization-use-pattern generating apparatus 100 according to the present embodiment.

As depicted in FIG. 9, the basic-pattern-shape generating unit 102a first obtains the angle of halftone dots specified by the angle specifying unit 102b and the number of pixels (n) specified by the number-of-pixels specifying unit 102c through the process of the computing unit 102d (step SB-1), and arbitrarily selects two integers a and b smaller than the number of pixels n/2 (or within a predetermined range) (step SB-2). The basic-pattern-shape generating unit 102a then calculates, through the process of the computing unit 102d, all integers c and d satisfying n=2(ad+bc) for these integers a and b (or those within a predetermined range) (step SB-3).

The basic-pattern-shape generating unit 102a then specifies a tetragon ABDC formed of four points of A(c, 1), B(a+c, b+1), C(0, d+1), D(a, b+d+1) based on the found parameters a, b, c, and d through the process of the computing unit 102d (step SB-4).

The basic-pattern-shape generating unit 102a then counts the number of pixels (N) included in the tetragon ABDC through the process of the computing unit 102d (step SB-5).

The basic-pattern-shape generating unit 102a then determines through the process of the computing unit 102d whether the number of pixels (N) included in the tetragon ABDC matches the number of pixels n/2 obtained at step SB-1 (step SB-6). If they do not match each other ("No" at step SB-6), the procedure returns to step SB-2 to select another combination of a, b, c, and d (step SB-7).

On the other hand, when the number of pixels (N) included in the tetragon ABDC matches the number of pixels n/2 obtained at step SB-1 ("Yes" at step SB-6), the basic-pattern-shape generating unit 102a next calculates the angle of the tetragon ABDC, that is, the angle of halftone dots, through the process of the computing unit 102d (step SB-8). Specifically, the computing unit 102d calculates an angle formed by a line segment AB (line segment BD) and the x axis and an angle formed by a line segment CD (line segment AC) and the x axis, these line segments forming the tetragon ABDC, and further calculates an average values of these angles as the angle of the halftone dots.

The basic-pattern-shape generating unit 102a then determines through the process of the computing unit 102d whether another combination of parameters a, b, c, and d is present (step SB-9). If another combination of parameters is present ("Yes" at step SB-9), the procedure returns to step SB-2. On the other hand, if another combination of parameters is not present ("No" at step SB-9), for all found parameters, the angle of the tetragon ABDC formed with each parameter is compared with the angle (screen angle) of half-tone dots specified at step SB-1 to select parameters a, b, c, and d forming the angle of halftone dots closest to the specified angle (step SB-10). That is, the basic-pattern-shape generating unit 102a performs comparison and study for each parameter through the process of the computing unit 102d, and selects parameters a, b, c, and d forming the angle of halftone dots closest to the angle of the specified angle.

The basic-pattern-shape generating unit 102a then places two of the tetragons ABDC formed with the selected parameters a, b, c, and d adjacently to each other through the process of the computing unit 102d, thereby generating a basic pattern (step SB-11).

The basic-pattern-shape generating unit 102a then outputs and stores the generated basic pattern into the basic pattern file 106a through the process of the computing unit 102d (step SB-12). With this, the basic-pattern-shape generating process ends.

Figure 10:
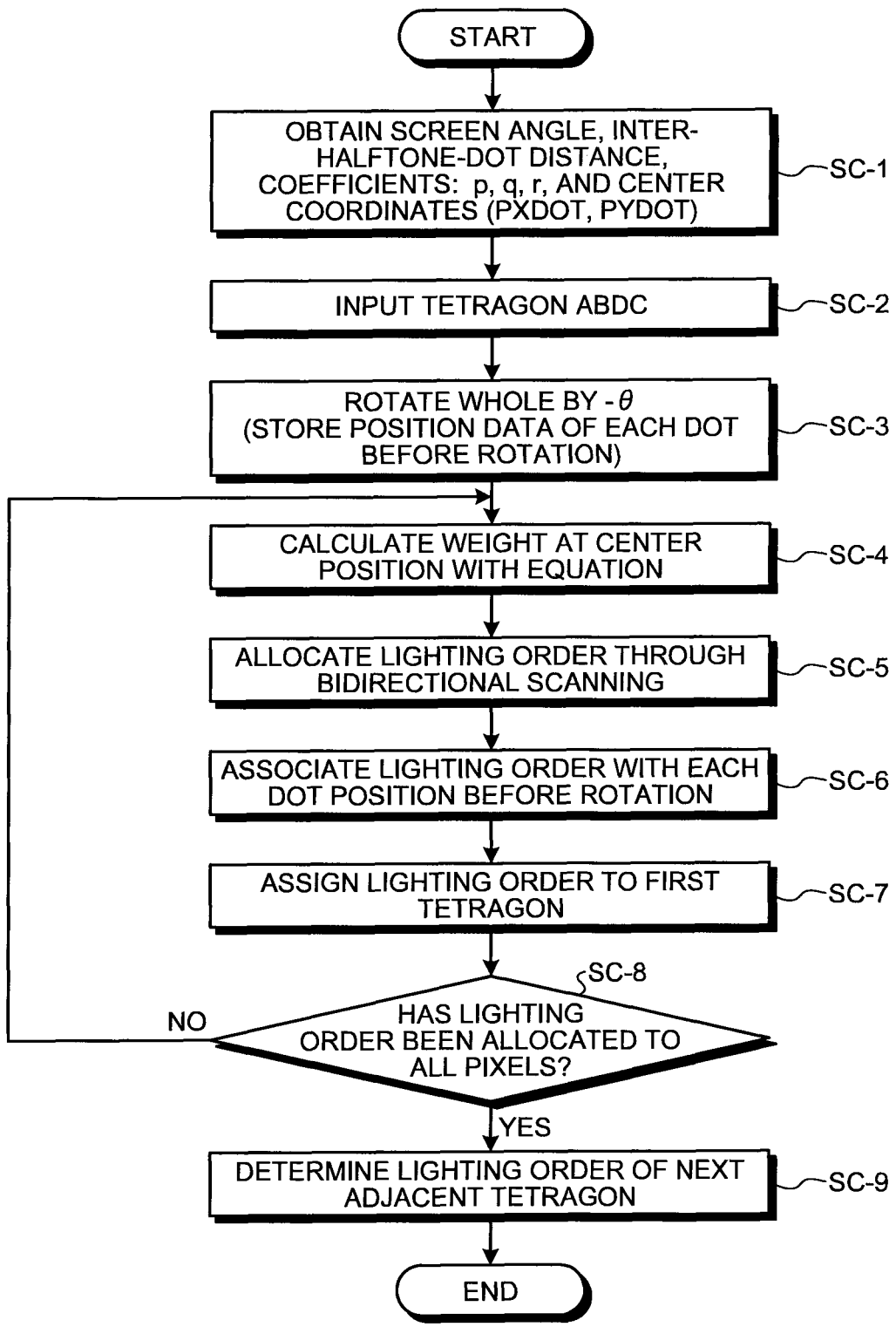
FIG. 10 is a flowchart of an example of a lighting-order determining process of the present binarization-use-pattern generating apparatus according to the present embodiment.

A lighting-order determining process through the process of the lighting-order determining unit 102e (process corresponding to step SA-4) is explained in detail with reference to FIG. 10. FIG. 10 is a flowchart of an example of the lighting-order determining process of the present binarization-use-pattern generating apparatus 100 according to the present embodiment.

In the binarization-use pattern, for each pixel forming the basic pattern, the order (lighting order) of fixing a color material (such as ink or toner) is set according to the level of gradation of the picture element. The lighting-order determining unit 102e is a unit that determines the lighting order of the pixels forming the basic pattern as depicted in FIG. 5, determining the lighting order of the pixels based on the distance between each pixel and a specific point in the basic pattern (for example, the barycenter or center of the basic pattern).

That is, the lighting-order determining unit 102e determines a lighting order so that the pixels forming the first tetragon of the basic pattern are lit in order of increasing distance from a specific point of the first tetragon (for example, the barycenter or center of the tetragon), and then determines a lighting order so that, continuously from the lighting order of the first tetragon, pixels forming the next tetragon of the basic pattern are lit in order of decreasing distance from the specific point of the next tetragon.

Here, in setting the lighting order, the lighting-order determining unit 102e may determine the lighting order so that a length of a boundary contour line (perimeter length) between a lit pixel and a non-lit pixel is minimum. With this, a dot gain (dot spreading) can be reduced more. Specifically, the lighting-order determining unit 102e may represent a distance from the specific point in the basic pattern to each pixel forming this basic pattern as a weight coefficient W by using Equation (1) below; for the first tetragon of the basic pattern, determine the lighting order of the pixels in order of decreasing weight W; and for the next tetragon of the basic pattern, determine the lighting order of the pixels in order of increasing weight W.

$$W = p - q \times \cos\alpha - r \times \cos\beta \quad (1)$$

where $\alpha$ and $\beta$ have values represented as $\alpha = x - \text{PXDOT}$ and $\beta = y - \text{PYDOT}$ when coordinates of a pixel forming the basic pattern shape are represented as (x, y) and coordinates of a point (specific point) as a barycenter or center of the basic pattern shape are represented as (PXDOT, PYDOT).

Also, p, q, and r herein are values (coefficients) of real numbers but not negative numbers that are appropriately set. q and r are coefficients for defining the shape of a halftone dot to be formed. As q increases, the halftone dot to be formed has an oval figure elongated in an x direction. As r increases, the halftone dot to be formed has an oval figure elongated in a y direction. Also, when q=r, the halftone dot has a circular shape. p is a number appropriately set so that the computation result of Equation (1) does not become negative, and is to facilitate handling (for example, sorting or the like) the calculated weight (W). Here, when Equation (1) is described with the use of an ellipticity (E), the following Equation (2) holds.

$$W = p - E \times \cos \alpha - (p-E) \times \cos \beta \quad (2)$$

where E is a coefficient (ellipticity) for defining the shape of a halftone dot to be formed, and is a floating decimal number satisfying a condition of $0.0 < E \leq p$. Here, when p=2.0 and E=1.0, the halftone dot has a circular shape. As the value of the ellipticity (E) is closer to 0.0 or 2.0, the halftone dot has a more elongated shape.

In this manner, the lighting-order determining unit 102e may be configured to determine the lighting order according to the distance between a pixel in the basic pattern and the specific point and based on a weight (W) set through computation for each pixel. In the following, the lighting-order determining process when the distance between each pixels and the specific point is found based on the weight (W) is explained in detail with reference to FIG. 10.

That is, as depicted in FIG. 10, the lighting-order determining unit 102e first determines, for the basic pattern shape generated by the basic-pattern-shape generating unit 102a and stored in the basic pattern file 106a, an angle of halftone dots (screen angle), an inter-halftone-dot distance, coefficients for weighting (p, q, r) and a point as the center or barycenter of each tetragon of the basic pattern shape as a specific point (PXDOT, PYDOT) (step SC-1). Here, the specific points (PXDOT, PYDOT) of the tetragon may be specified in advance by the user (operator) or may be calculated by the lighting-order determining unit 102e. Also, each of the coefficients (p, q, r) for weighting may be controlled as being set by the user.

Here, in determining the specific point, when the specific point is positioned at the center of the pixels of the tetragon, it is assumed that the coordinates of that specific point are represented as a natural number. When the specific point is positioned on a boundary between adjacent pixels, the natural number ±0.5 may be used. Also herein, the lighting-order determining unit 102e may calculate a distance between specific points when the basic patterns are arranged adjacently to each other.

Next, the lighting-order determining unit 102e obtains a basic pattern generated by the basic-pattern-shape generating unit 102a and stored in the basic pattern file 106a (step SC-2), and finds a distance from the specific point in the sub-scanning direction (x-axis direction) and the main scanning direction (y-axis direction) for each pixel of the first tetragon ABDC of the basic pattern.

Then, while storing the position of each pixel before rotation, the lighting-order determining unit 102e uses affine transformation to rotate the first tetragon of this basic pattern about the specific point (center point) by −θ degrees (θ is an angle of halftone dots (screen angle) set in advance: for example, 45 degrees) to return the shape to an approximately rectangular shape (step SC-3).

The lighting-order determining unit 102e then calculates a weight (W) for each pixel of the first tetragon of the basic pattern rotated by −θ (step SC-4).

The lighting-order determining unit 102e then sets the lighting order of the first tetragon forming the basic pattern based on this weight (W) (step SC-5).

That is, the lighting-order determining unit 102e divides the first tetragon rotated by −θ degrees into two portions, upper and lower, with a horizontal line including the center point (specific point) as a border and, first for each of (the number of pixels of the basic pattern n/4+1) pixels on the upper-half portion of the first tetragon forming the basic pattern, conducts a sequential search for a weight (W) from the upper-left pixel to a horizontally rightward direction. Then, this search for a weight (W) for each pixel in the horizontal direction is repeatedly conducted until reaching the lower-right pixel of the first tetragon by moving one line in a vertically downward direction. Thereafter, the lighting-order determining unit 102e sets a lighting number of "1" to a pixel having the largest weight (W) of all pixels forming the upper-half portion of the first tetragon.

Then, for each of (the number of pixels of the basic pattern n/4+1) pixels on the lower-half portion of the first tetragon forming the basic pattern, the lighting-order determining unit 102e conducts a sequential search for a weight (W) from the lower-right pixel to a horizontally leftward direction. Then, this search for a weight (W) for each pixel in the horizontal direction is repeatedly conducted until reaching the upper-left pixel of the first tetragon by moving one line in a vertically upward direction. Thereafter, the lighting-order determining unit 102e sets a lighting number of "2" to a pixel having the largest weight (W) of all pixels forming the lower-half portion of the first tetragon.

Then while excluding the pixels for which the lighting order has already been determined, the lighting-order determining unit 102e sets a lighting order in order of decreasing weight (W) for the pixels of the upper-half and lower-half portions of the first tetragon forming the basic pattern in an alternating manner. Here, in setting the lighting order, when the weight (W) values of two or more pixels are equal, the lighting-order determining unit 102e sets the lighting order from a pixel accessed earlier first.

Next, the lighting-order determining unit 102e associates the first tetragon of the basic pattern (the basic pattern before rotation by −θ) with the lighting order set to the first tetragon rotated by −θ (step SC-6), thereby setting the lighting order to the first tetragon of the basic pattern (step SC-7).

The lighting-order determining unit 102e then determines whether to set the lighting order to all pixels in the first tetragon forming the basic pattern (step SC-8). When a pixel not set the lighting order is present ("No" at step SC-8), the procedure returns to step SC-4.

On the other hand, when the lighting order has been set to all pixels ("Yes" at step SC-8), the lighting order is determined for each pixel of the next tetragon that is adjacent to the first tetragon and forms the basic pattern (step SC-9). Here, the lighting order of the next tetragon forming the basic pattern may be set in a manner similar to the process of steps SC-1 to SC-8 such that the lighting order is set in order of increasing weight (W) continuously from the last number of the first tetragon. Preferably, however, the lighting order of the next tetragon of the basic pattern may be determined based on an equation of I2=n−I1+1, where I2 is a number indicating a place in the lighting order of the next tetragon, n is the number of pixels of the basic pattern, and I1 is a number indicating a place in the lighting order of the first tetragon. With this, the lighting-order determining process can be quickly performed. The lighting-order determining process now ends.

Figure 11:
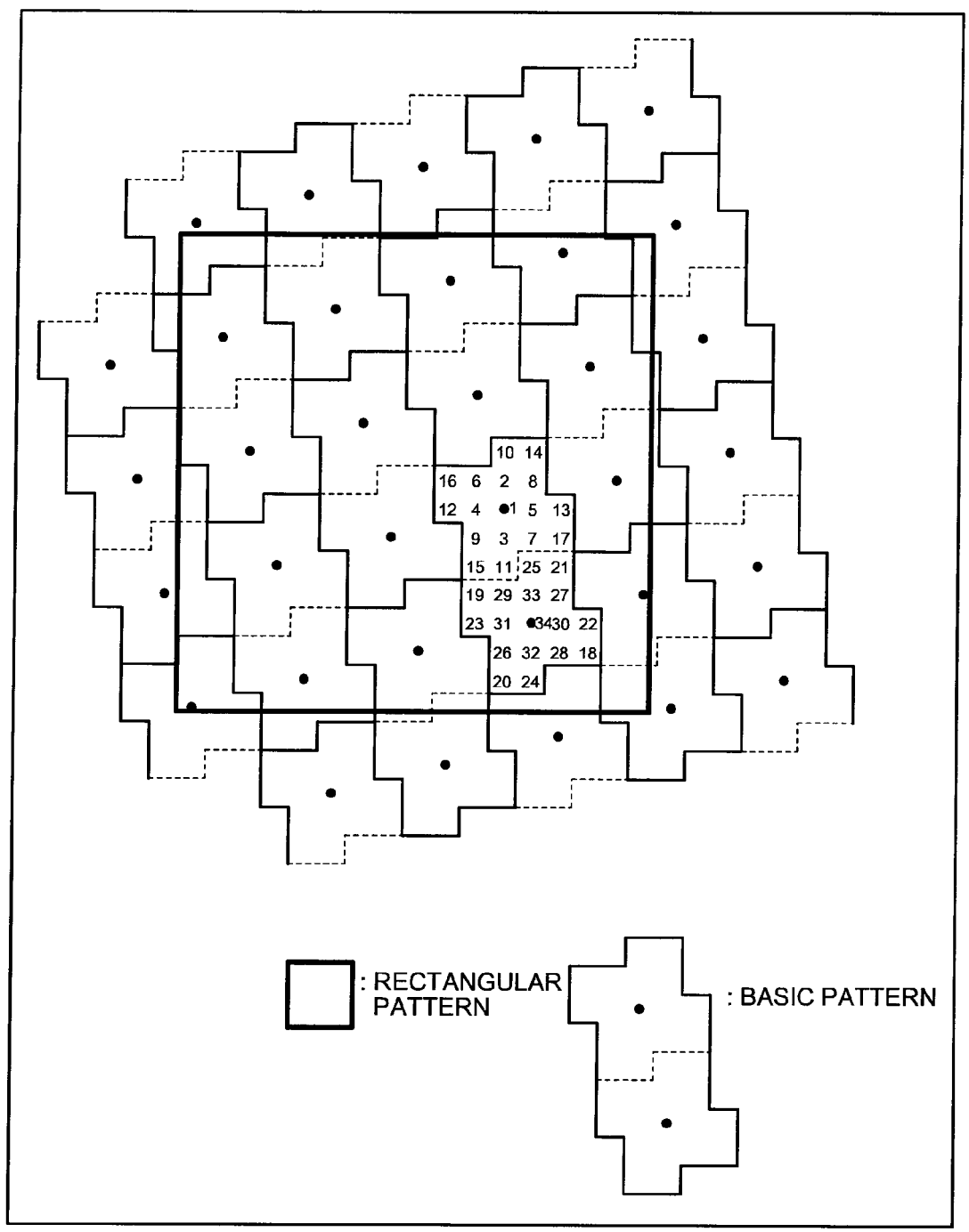
FIG. 11 is a drawing of an example of a rectangular pattern.

A rectangular-pattern generating process (a process corresponding to step SA-5) through the process of the rectangular-pattern generating unit 102f is explained in detail below with reference to FIGS. 11 and 12.

The rectangular-pattern generating unit 102f generates a rectangular pattern that functions as a binarization-use pattern based on the basic pattern, cutting and generating a rectangular pattern of a specific size as a binarization-use pattern from out of continuous patterns formed by repeatedly arranging the basic pattern in the main scanning direction and the sub-scanning direction of an image so that the next tetragon is placed adjacently to each of four directions of the first tetragon forming the basic pattern.

The reason for forming as a rectangular pattern is that, in general, for binarizing a multi-value image, when the CPU develops a binarization-use pattern onto a RAM, a binarization-use pattern shaped in a square or rectangle is developed onto the RAM. FIG. 11 is a drawing of an example of the rectangular pattern. The rectangular-pattern generating unit 102f cuts and generates a rectangular pattern of a specific size as depicted in FIG. 11 as a binarization-use pattern.

That is, the rectangular-pattern generating unit 102f forms a rectangular pattern of a specific size so that, when the binarization-use pattern (hereinafter, also referred to as a rectangular pattern) formed in a rectangular shape is repeatedly placed in the main scanning direction and the sub-scanning direction of an image, halftone dots of the same shape are continuously placed at the same angle and equally spaced apart from each other.

A rectangular-pattern generating technique by the rectangular-pattern generating unit 102f is explained below with reference to FIG. 12. FIG. 12 is a flowchart of an example of a rectangular-pattern generating process of the binarization-use-pattern generating apparatus 100 according to the present embodiment.

Figure 12:
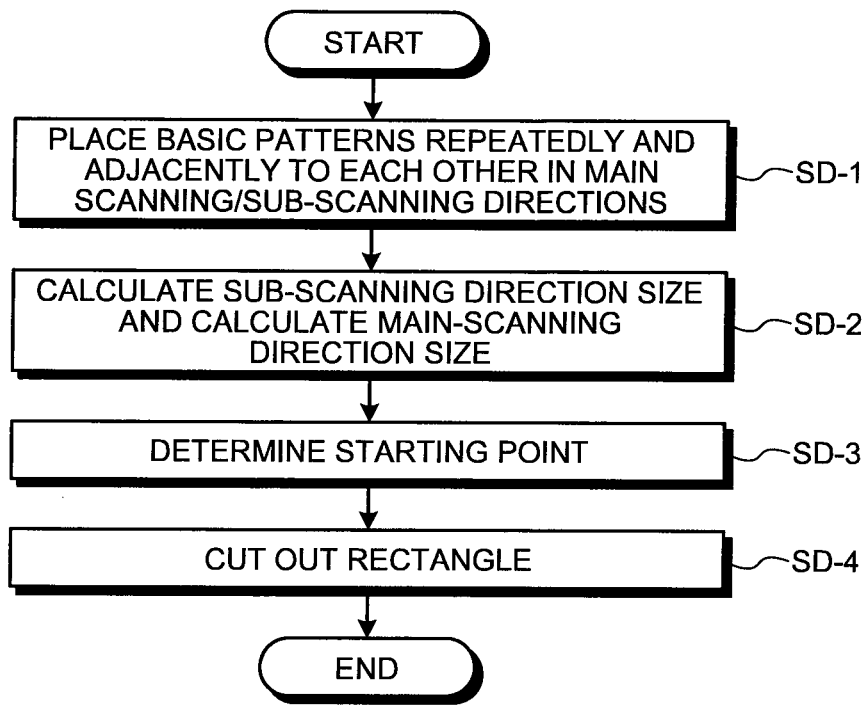
FIG. 12 is a flowchart of an example of a rectangular-pattern generating process of the binarization-use-pattern generating apparatus according to the present embodiment.

As depicted in FIG. 12, the rectangular-pattern generating unit 102f repeatedly places the basic pattern with lighting order provided by the lighting-order determining unit 102e in the main scanning direction and sub-scanning direction so that the next tetragon is placed adjacently to each of four directions of the first tetragon forming the basic pattern (step SD-1).

The rectangular-pattern generating unit 102f then calculates a size (X) in the sub-scanning direction and a size (Y) in the main scanning direction of the rectangular pattern so that, when the rectangular pattern is repeatedly placed in the main scanning direction and the sub-scanning direction of the image, halftone dots of the same shape are continuously placed at the same angle and equally spaced apart from each other (step SD-2). Here, for a specific calculation method, Patent Document 1 may be referred to.

The rectangular-pattern generating unit 102f then determines an arbitrary starting point (step SD-3), cuts a rectangular portion of the size (X) in the sub-scanning direction and the size (Y) in the main scanning direction from this starting point to generate a rectangular pattern, and then stores the generated rectangular pattern in the binarization-use pattern file 106c (step SD-4). The rectangular-pattern generating process now ends.

Explanation of the process of the present binarization-use-pattern generating apparatus 100 in the present embodiment is now completed.

The printing apparatus 114 forms an image on a medium (such as paper) based on the binarization-use pattern formed in the manner explained above, and is implemented by, for example, a printer such as an ink-jet printer or a laser printer. In the printing apparatus 114, for example, an ink-jet mechanism, a laser diode unit, a photosensitive drum, and others function as the image forming unit 114b that forms an image on the medium.

Here, in the printing apparatus 114, a processor or the like included in the printing apparatus 114 may function as the binarizing unit 114a for binarization based on the binarization-use pattern. Alternatively, in a printing system, a computer (for example, the binarization-use-pattern generating apparatus 100) having connected thereto the printing apparatus 114 (printer) may function as the binarizing unit 114a. As such, various modifications can be made within a range not deviating from the gist of the present invention.

Figure 13:
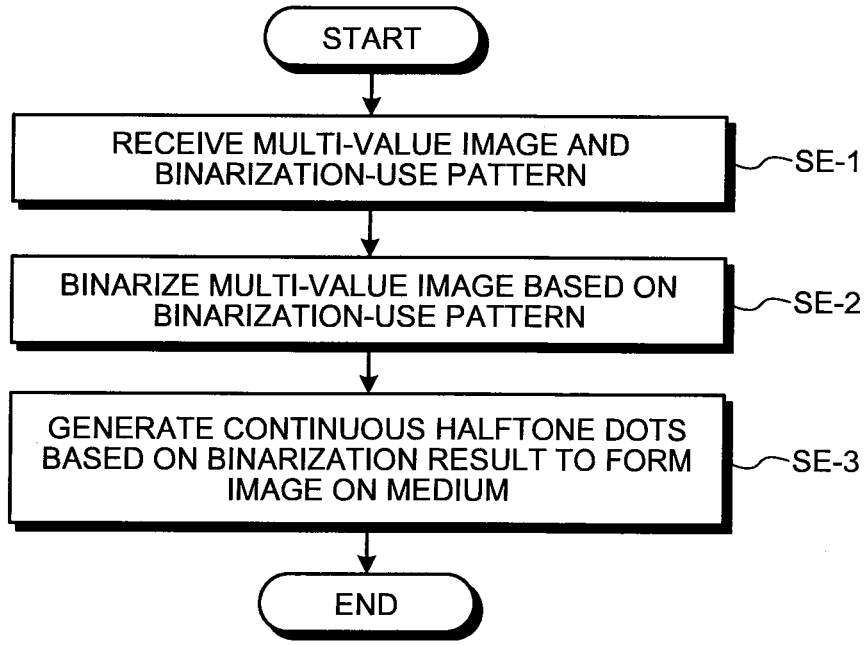
FIG. 13 is a drawing of an example of a process of a printing apparatus according to an embodiment.

In this printing apparatus 114 or printing system, binarization of a multi-value image based on the binarization-use pattern generated as explained above is performed at the binarizing unit 114a, thereby determining ON/OFF of the color material on the medium. Then, based on the binarization result, the image forming unit 114b applies the color material onto the medium, thereby forming an image. In the following, an embodiment in which the binarizing unit 114a is provided to the printing apparatus 114 is explained with reference to FIG. 13. FIG. 13 is a drawing of an example of a process of the printing apparatus 114 according to an embodiment.

As depicted in FIG. 13, the binarization-use-pattern generating apparatus 100 controls the input/output control interface unit 108 and transmits to the printing apparatus 114 the binarization-use pattern generated as in the embodiment and stored in the binarization-use pattern file 106c together with the multi-value image information stored in the multi-value picture-element file 106b.

Then, when receiving the binarization-use pattern and the multi-value image information (step SE-1), the printing apparatus 114 binarizes the multi-value image based on the received binarization-use pattern through the process of the binarizing unit 114a (step SE-2). Specifically, the binarizing unit 114a performs binarization by comparing a picture-element value of the multi-value image with a threshold set for the binarization-use pattern by a comparator. For example, the binarizing unit 114a compares the number of gradation levels of dots of the binarization-use pattern and the picture-element value to determine the position up to which corresponding halftone dots are lit.

The printing apparatus 114 then generates continuous halftone dots based on the result of binarization performed by the binarizing unit 114a to form an image on the medium (step SE-3). Explanation of the printing apparatus 114 in the present embodiment is now completed.

In the foregoing, while the embodiments of the present invention have been explained, the present invention can be implemented with various different embodiments other than the embodiments explained above, within the range of the technical idea described in the claims, and the conventional technologies disclosed in Patent Document 1 and others may be referred to for implementing various processes.

Also, in the embodiment, the example is explained in which the binarization-use-pattern generating apparatus 100 is in a stand-alone form for processing. Alternatively, the process may be performed in response to a request from a client terminal configured separately from the binarization-use-pattern generating apparatus 100, and the process result then may be returned to the client terminal.

Furthermore, for example, in the embodiment, the basic pattern is rotated by −θ, and the lighting order is set to this rotated basic pattern. However, this is not meant to be restrictive, and the lighting order may be set directly without rotating the basic pattern.

Still further, in the embodiment, the lighting-order determining unit 102e divides the basic pattern into two portions, upper and lower, with a horizontal line including the center point (specific point) as a border and, for pixels of the upper portion and those of the lower portion, sets the lighting order in order of decreasing weight (W) in an alternating manner. However, this is not meant to be restrictive. For example, the basic pattern may be divided into two portions, right and left, with a vertical line including the specific point as a border and, for pixels of the right-half portion and pixels of the left-half portion, the lighting order may be set in order of decreasing weight (W) in an alternating manner.

Still further, among the processes explained in the embodiments, all or part of the processes explained as being automatically performed can be manually performed, or all or part of the processes explained as being manually performed can be automatically performed through a known method.

In addition, the process procedure, the control procedure, specific names, information including registered data and parameters of each process, and the database structure depicted in the specification or drawings can be arbitrarily changed unless otherwise specified.

Still further, as for the binarization-use-pattern generating apparatus 100, each component depicted is conceptual in function, and is not necessarily physically configured as depicted.

Still further, for example, all or an arbitrary part of process functions included in each device of the binarization-use-pattern generating apparatus 100, in particular, each process function performed at the controlling unit 102 can be achieved by a CPU (Central Processing Unit) or a program interpreted and executed on that CPU, or can be achieved as hardware with a wired logic. Here, the program is recorded in a recording medium explained below, and is mechanically read by the binarization-use-pattern generating apparatus 100 as required. That is, the storage unit 106 such as ROM or HD (Hard Disk drive) and others have stored therein a computer program for giving an instruction to the CPU in conjunction with the OS (Operating System) to perform various processes. This computer program is executed by being loaded into the RAM, configuring a controlling unit in conjunction with the CPU.

Still further, this computer program may be stored in an application program server connected via an arbitrary network 300 to the binarization-use-pattern generating apparatus 100, and also all or part thereof can be downloaded as required.

Still further, the program according to the present invention can be stored in a computer-readable storage medium. It is assumed herein that this "storage medium" includes an arbitrary "portable physical medium", such as a flexible disk, a magneto-optical disk, a ROM, an EPROM, an EEPROM, a CD-ROM, an MO, or a DVD, or a "communication medium" retaining a program in a short period of time, such as a communication line or a carrier wave when the program is transmitted via a network typified by a LAN, a WAN, or the internet.

Still further, the "program" means a data processing method described with an arbitrary language or describing method, irrespectively of the format, such as source code and binary code. Here, the "program is not restricted to be configured singly, but includes the one configured in a distributed manner as a plurality of modules or libraries and the one achieving its functions in conjunction with a separate program typified by an OS (Operating System). Here, any known configuration and procedure can be used as a specific configuration for reading the storage medium in each component depicted in the embodiments, a reading procedure, an installation procedure after reading, and others.

Various databases and others stored in the storage unit 106 (the basic pattern file 106a to the binarization-use-pattern file 106c) are memory devices such as RAM and ROM, fixed disk devices such as hard disks, and storage units such as flexible disks and optical disks, storing various processes, various programs, tables, databases, and others.

Still further, the binarization-use-pattern generating apparatus 100 may be achieved by implementing software (including programs, data, and others) for connecting an existing information processing apparatus, such as a personal computer or a work station to cause the information processing apparatus to achieve the method of the present invention.

Still further, specific patterns of distribution and unification of the apparatus are not restricted to those depicted in the drawings, and all or part of them can be configured as being functionally or physically distributed or unified in arbitrary units according to various additions and others or functional loads.

According to the present invention, the ink fixing regions can be separated from each other as much as possible, preventing "color hopping" due to an abrupt expansion of the ink fixing regions due to surface tension of ink. Also, in particular, when each ink fixing region accounts for 50%, the above phenomenon of adherence to an adjacent ink fixing region becomes maximum. "Color hopping" in this can be reduced, thereby reducing fluctuations in print quality due to print conditions.

Furthermore, when the ink fixing area exceeds 90%, ink spreads to increase the possibility of crushing white portions of paper. According to the present invention, it is possible to design so that such a phenomenon most unlikely occurs. That is, according to the above, gradation crushing due to ink spreading can be prevented and, as a result, printing with multiple levels of gradation can be achieved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A method of generating a binarization-use pattern for use in binarization of a multi-value image, the method executed by a binarization-use-pattern generating apparatus and comprising:
generating a basic pattern of the binarization-use pattern through calculation;
determining a lighting order of pixels forming the basic pattern; and
generating, based on the basic pattern, a rectangular pattern that functions as the binarization-use pattern, wherein
the generating the basic pattern comprises:
specifying an angle of the binarization-use pattern;
specifying the number of pixels forming the basic pattern; and
generating a basic-pattern-shape through calculation based on the angle specified at the specifying the angle and the number of pixels specified at the specifying the number of pixels,
at the generating the basic-pattern-shape,
tetragons are generated, each of the tetragons being formed of four points of a point A(c, 1), a point B(a+c, b+1), a point C(0, d+1), and a point D(a, b+d+1)

specified with arbitrary parameters a, b, c, and d, where a, b, c, and d are integers, satisfying the number of pixels n=2(ad+bc) specified at the specifying the number of pixels, from among the generated tetragons, a tetragon having an angle closest to the angle of the binarization-use pattern specified at specifying the angle is selected, and two of the selected tetragons are placed adjacently to each other to generate the basic pattern, and at the determining the lighting order, the lighting order is determined so that pixels forming a first tetragon of the tetragons of the basic pattern are lit in order of increasing distance from a specific point of the first tetragon, and the lighting order is determined so that, continuously from the lighting order of the first tetragon, pixels forming a tetragon next to the first tetragon of the tetragons of the basic pattern are lit in order of decreasing distance from the specific point of the next tetragon.

2. The binarization-use-pattern generating method according to claim 1, wherein at the determining the lighting order, the lighting order of the next tetragon is determined based on an equation of I2=n−I1+1, where I2 is a number indicating a place in the lighting order of the next tetragon, n is the number of pixels specified at specifying the number of pixels, and I1 is a number indicating a place in the lighting order of the first tetragon.

3. A printing apparatus comprising:

a binarizing unit that binarizes a multi-value image based on a binarization-use pattern; and an image forming unit that forms an image on a medium based on results of binarization performed by the binarizing unit, wherein a basic pattern is formed by placing two tetragons adjacently to each other, each of the tetragons being formed of four points of a point A(c, 1), a point B(a+c, b+1), a point C(0, d+1), and a point D(a, b+d+1) specified with arbitrary parameters a, b, c, and d, where a, b, c, and d are integers, satisfying the number of pixels n=2(ad+bc) of the basic pattern, the binarization-use pattern is generated based on the basic pattern, and according to a gradation of the multi-value image, the pixels are lit so that pixels forming a first tetragon of the tetragons of the basic pattern are lit in order of increasing distance from a specific point of the first tetragon, and the pixels are lit so that, continuously from the lighting order of the first tetragon, pixels forming a tetragon next to the first tetragon of the tetragon of the basic pattern are lit in order of decreasing distance from the specific point of the next tetragon, thereby generating continuous halftone dots.

4. The printing apparatus according to claim 3, wherein pixels forming the next tetragon are lit in an order based on an equation of I2=n−I1+1, where I2 is a number indicating a place in the lighting order of the next tetragon, n is the number of pixels of the basic pattern, and I1 is a number indicating a place in the lighting order of the first tetragon.

* * * * *